(12) United States Patent
Civanlar

(10) Patent No.: US 6,181,690 B1
(45) Date of Patent: Jan. 30, 2001

(54) TOLL-FREE INTERNET SERVICE

(75) Inventor: Mehmet Reha Civanlar, Middletown, NJ (US)

(73) Assignee: AT&T Corp., New York, NY (US)

( * ) Notice: Under 35 U.S.C. 154(b), the term of this patent shall be extended for 0 days.

(21) Appl. No.: 08/896,370

(22) Filed: Jul. 18, 1997

(51) Int. Cl.[7] ............................................... H04L 12/66
(52) U.S. Cl. ........................................... 370/352; 379/212
(58) Field of Search ................................ 370/352, 353, 370/354, 383, 389, 390, 392, 401, 408; 379/212

(56) References Cited

U.S. PATENT DOCUMENTS

| | | | |
|---|---|---|---|
| 5,867,494 | * 2/1999 | Krishnaswamay et al. | 370/352 |
| 5,867,495 | * 2/1999 | Elliott et al. | 370/352 |
| 5,999,612 | * 12/1999 | Dunn et al. | 379/212 |
| 6,012,088 | * 12/1999 | Li et al. | 395/200.52 |

OTHER PUBLICATIONS

"Firewalls and Internet Security" by W. R. Cheswick, et a., *Addison–Wessley*, 1994, pp. 85–118.

* cited by examiner

*Primary Examiner*—Huy D. Vu
*Assistant Examiner*—Alexander Boakye

(57) ABSTRACT

A method is provided for establishing a toll-free connection between an end user and a site provider associated with a data-network connected device. The method includes the steps of: receiving predefined log-in information from the end user; identifying a site provider associated with the log-in information as belonging to a class of site providers offering toll-free data network access to end users; establishing a data network connection to the device associated with the site provider while preventing the end user from communicating over the data network with any party other than those parties authorized by the site provider; and allocating charges associated with the data network connection to the site provider.

7 Claims, 1 Drawing Sheet

TOLL-FREE INTERNET SERVICE

BACKGROUND OF THE INVENTION

Conventional toll-free telephony service is a common method by which a business/subscriber can receive collect calls from an end-user. When an "800" number or "toll-free" number is dialed by the end user, the call can be routed to a regular telephone number, and the charge for that call may be billed to the called number. In order to process the call, a database (i.e., a network control point) is queried by a network switch to determine the actual destination number for the call. This destination number is then used by the switch to route the call through the network to the appropriate destination.

In contrast to the telephone network, Internet subscriber's currently do not have a way to offer toll-free access to end users. This has not presented a large problem because end users typically access the Internet through their own individual accounts with an Internet service provider, which often charge a flat rate to end users for unlimited Internet access. Accordingly, end users typically do not incur an additional charge to access an Internet site.

However, as the number of Internet users grows, it will become increasingly more difficult for Internet service providers to continue offering a flat rate for Internet access.

SUMMARY OF THE INVENTION

In accordance with the present invention, a method is provided for establishing a toll-free connection between an end user and a site provider associated with a data-network connected device. The method includes the steps of: receiving predefined log-in information from the end user; identifying a site provider associated with the log-in information as belonging to a class of site providers offering toll-free data network access to end users; establishing a data network connection to the device associated with the site provider while preventing the end user from communicating over the data network with any party other than those parties authorized by the site provider; and allocating charges associated with the data network connection to the site provider.

DETAILED DESCRIPTION

Figure 1:
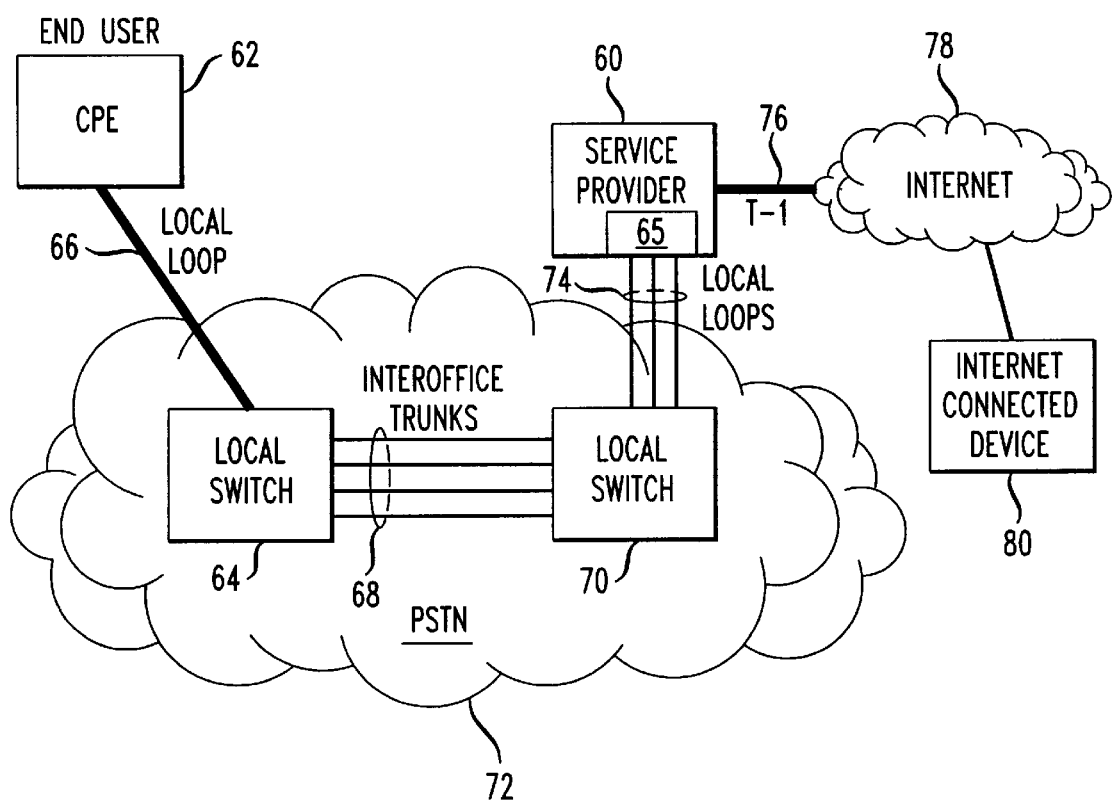
FIG. 1 shows a simplified schematic diagram of a communications path between an end user 62 and an Internet connected device 80 constructed in accordance with the present invention.

FIG. 1 shows a simplified schematic diagram of the communications path between an end user 62 and an Internet connected device 80 such as a server via the end user's local telephone loop. An individual end user 62 subscribes to the service of a commercial network service provider 60 (e.g., an Internet service provider). Access to a data network is usually achieved by dialing the telephone number of the service provider using a modem. Specifically, the end user 62 uses a modem and makes a dialup connection to a local switch 64 via the end user's local loop 66. The local switch 64 makes an inter-office trunk connection 68 to a terminating local switch 70 within a PSTN 72. The terminating local switch connects through a local loop 74 and a terminating modem to the service provider 60. After a proper modem handshaking protocol, the user can send and receive data packets to and from any Internet connected device. Data networks and database services are accessed using the TCP/IP protocol. The Internet packets are routed over a link 76 such as a T-1 link to the Internet 78. Once a communication session is established, the end user 62 may employ an application program such as a world wide web browser to communicate with other devices on the Internet.

Two distinct costs are incurred when the end user 62 establishes communication with an Internet connected device 80 in the conventional manner. First, there is the cost associated with the telephone call from the end user 62 to service provider 60 over PSTN 72. Second, there is the cost charged by service provider 60 for facilitating communication with device 80 over the data network 78. The present invention offers a method by which the latter cost may be incurred by the Internet site providers associated with device 80 rather than the end user 62. In some embodiments of the invention the former charge is incurred by the Internet site provider associated with device 80 as well, thus offering the end user 62 completely toll-free Internet access.

A variety of methods may be used to charge the cost of the telephone call over PSTN 72 to service provider 60 so that completely toll-free Internet access is offered to end user 62. For example, the service provider 60 may provide to end users a conventional toll-free telephone number. Charges that accrue on this number can be divided among the various toll-free Internet site providers that maintain toll-free accounts with the service provider 60. Specifically, the charges may be apportioned based on the relative usage of the account by the site providers. Alternatively, the service provider 60 may offer an extensive number of local points-of-presence so that there is a local access number for all potential end users 62. The service provider 60 may offer the equivalent of a global point-of-presence by providing roaming arrangements in cooperation with other service providers.

In accordance with the present invention, the end user 62 connects (whether by toll-free access or otherwise) to a selected Internet service provider and uses a predefined set of log-in information such as a user name and a password that is defined by the toll-free site provider to establish the Internet connection. The service provider 60 associates the end user 62 with a toll-free Internet site provider's account based on the log-in information. An application level gateway 65 serves as a filter so that the end-user's access to the Internet 78 is limited to the set of addresses, ports and applications defined by the toll-free Internet site provider. Such an application level gateway 65 may be implemented by conventional network firewall technology, for example, such as described in *Firewalls and Internet Security*, Cheswick and Bellovin, Addison-Wessley, 1994, pp. 85–119. The gateway 65 may only forward select data packets received from the end-user 62 to the device 80. For example, only packets employing an appropriate protocol such as the hyper text transport protocol (HTTP)) addressed to a predetermined IP address and port number may be forwarded. Packets that have unauthorized destination addresses, ports or protocols can be filtered by the gateway so that the service is not used for general purpose Internet access.

Once the communication session between the end user 62 and the device 80 is complete, the cost of the call is allocated to the account of the service provider associated with device 80. This task may be performed by conventional billing systems such as employed in conventional toll-free telephony service.

What is claimed is:

1. A method for establishing a toll-free connection between an end user and a site provider associated with a data-network connected device, said method comprising the steps of:

receiving predefined log-in information from the end user;

identifying a site provider associated with said log-in information as belonging to a class of site providers offering toll-free data network access to end users;

establishing a data network connection to said device associated with said site provider while preventing said end user from communicating over said data network with any party other than those parties authorized by said site provider;

allocating charges associated with said data network connection to said site provider.

2. The method of claim 1 wherein said data network is the Internet.

3. The method of claim 2 wherein said log-in information address is received over a public switched telephone network.

4. The method of claim 2 wherein the preventing step is performed by an application level gateway.

5. The method of claim 3 wherein charges associated with transmitting said address over the public switched telephone network are allocated to said site provider.

6. The method of claim 3 wherein said log-in information is received from said end user via a point-of-presence local to said end user.

7. The method of claim 2 wherein said user employs a world wide web browser and further comprising the step of providing a web page to said end user in conformance with a requirement of said browser.

* * * * *